United States Patent
Beckhaus

(10) Patent No.: US 10,989,812 B2
(45) Date of Patent: Apr. 27, 2021

(54) FOUNDATION ENGINEERING APPARATUS AND FOUNDATION ENGINEERING METHOD

(71) Applicant: BAUER Spezialtiefbau GmbH, Schrobenhausen (DE)

(72) Inventor: Karsten Beckhaus, Munich (DE)

(73) Assignee: BAUER Spezialtiefbau GmbH, Schrobenhausen (DE)

( * ) Notice: Subject to any disclaimer, the term of this patent is extended or adjusted under 35 U.S.C. 154(b) by 0 days.

(21) Appl. No.: 16/325,368

(22) PCT Filed: Jul. 3, 2017

(86) PCT No.: PCT/EP2017/066441
§ 371 (c)(1),
(2) Date: Feb. 13, 2019

(87) PCT Pub. No.: WO2018/054568
PCT Pub. Date: Mar. 29, 2018

(65) Prior Publication Data
US 2019/0204440 A1      Jul. 4, 2019

(30) Foreign Application Priority Data

Sep. 20, 2016 (EP) .................................. 16189732

(51) Int. Cl.
*G01S 17/08* (2006.01)
*E02D 13/06* (2006.01)
(Continued)

(52) U.S. Cl.
CPC .............. *G01S 17/08* (2013.01); *E02D 13/06* (2013.01); *E02F 3/436* (2013.01); *E02F 5/145* (2013.01); *G01B 21/047* (2013.01); *E02D 33/00* (2013.01)

(58) Field of Classification Search
CPC ......... G01S 17/08; E02D 13/06; E02D 33/00; E02F 3/436; E02F 5/145; G01B 21/047
(Continued)

(56) References Cited

U.S. PATENT DOCUMENTS 4,579,481 A * 4/1986 Gerwick ............. E02B 17/0021
405/203
6,363,632 B1 * 4/2002 Stentz ..................... E02F 3/437
37/414
(Continued)

FOREIGN PATENT DOCUMENTS

CN        1906362 A     1/2007
GB        2 422 389 A   7/2006

OTHER PUBLICATIONS

International Search Report issued in PCT/EP2017/066441; dated Aug. 27, 2017.
(Continued)

*Primary Examiner* — Seung C Sohn
(74) *Attorney, Agent, or Firm* — Studebaker & Brackett PC

(57) ABSTRACT

The invention relates to a civil engineering device and a civil engineering method for using a civil engineering device. The device has a support device, a ground preparation tool, which prepares the ground at a preparation location, and at least one GPS unit, which is arranged on the support device and is designed to determine the position of the preparation location, wherein the GPS unit is arranged at a distance from the ground preparation location. The civil engineering device is characterised in that a measuring device is provided in addition to the GPS unit, the measuring device being designed to determine the distance between the GPS unit and the preparation tool.

11 Claims, 1 Drawing Sheet

(51) Int. Cl.
*E02F 3/43* (2006.01)
*E02F 5/14* (2006.01)
*G01B 21/04* (2006.01)
*E02D 33/00* (2006.01)

(58) Field of Classification Search
USPC .................................................. 250/559.38
See application file for complete search history.

(56) References Cited

U.S. PATENT DOCUMENTS

| | | | | |
|---|---|---|---|---|
| 7,116,269 | B2* | 10/2006 | Nichols | G01C 15/004 |
| | | | | 342/357.28 |
| 7,669,354 | B2* | 3/2010 | Aebischer | E02F 9/264 |
| | | | | 37/348 |
| 7,808,626 | B2* | 10/2010 | Nichols | G01S 19/10 |
| | | | | 356/139.01 |
| 8,370,075 | B2* | 2/2013 | Goldman | G01B 5/0035 |
| | | | | 702/19 |
| 2012/0200452 | A1 | 8/2012 | Jones | |

OTHER PUBLICATIONS

International Preliminary Report on Patentability issued in corresponding International Application No. PCT/EP2017/066441; dated Apr. 4, 2019.
An Office Action mailed by the National Intellectual Property Administration of the People's Republic of China dated Jun. 12, 2020, which corresponds to Chinese Patent Application No. 201780050153.9 and is related to U.S. Appl. No. 16/325,368 with English language translation.

* cited by examiner

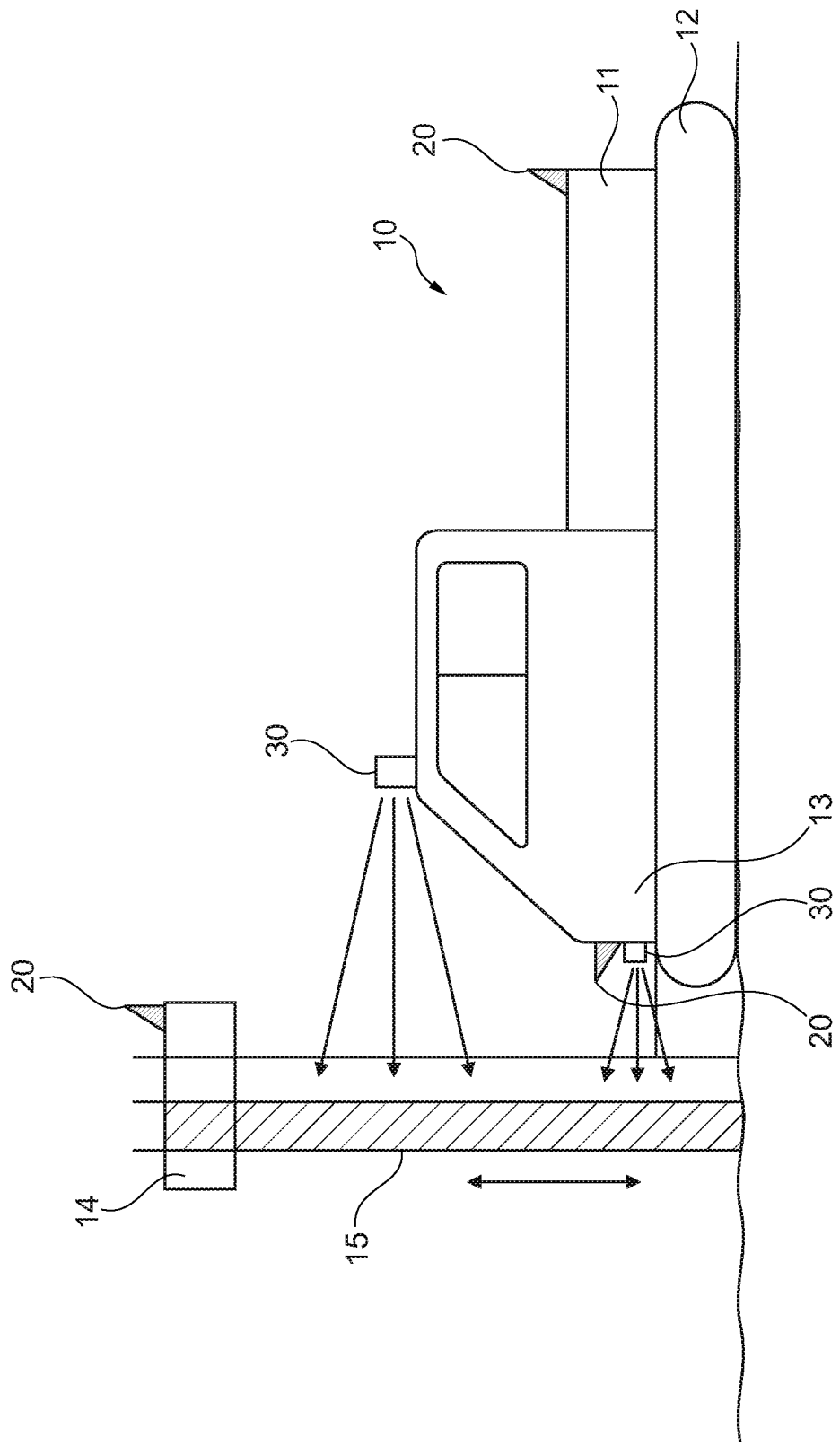

FOUNDATION ENGINEERING APPARATUS AND FOUNDATION ENGINEERING METHOD

The invention relates to a foundation engineering apparatus in accordance with the preamble of claim 1 and to a foundation engineering method in accordance with the preamble of claim 9.

Such a foundation engineering apparatus has a carrier device, a ground working tool which works the ground at a working location and at least one GPS-unit which is arranged on the carrier device and designed to determine the position of the working location, wherein the GPS-unit is arranged at a distance to the ground working location.

In such a foundation engineering method using a foundation engineering apparatus ground at a ground working location is worked with a ground working tool which is arranged on a carrier device and a position of the ground working location is determined by means of at least one GPS-unit which is spaced from the working location.

When carrying out foundation engineering works, in particular those that are to be undertaken at precise locations, there is the need to determine as precisely as possible the position of the ground working tool in an area to be worked upon. For instance positional data are sent to remote control centers so that a virtual image of the construction site works can be produced.

In this connection, it is known that a GPS-unit is arranged in a rear area of the construction apparatus. The offset of the GPS-unit with respect to the ground working tool can be taken into account in the form of a defined distance when calculating the position of the ground working tool. In doing so, it is assumed that the ground working tool has a constant distance with respect to the GPS-unit. In principle, however, deviations can occur, for instance a bearing play in components of the apparatus, the exchange of the ground tool for a ground working tool of a different shape or size as well as mast adjustments, inclinations and conversions.

Furthermore, it is known that the GPS-unit is arranged relatively close to the working location, e.g. on the mast head. However, when positioned on the mast head the delicate GPS-unit is increasingly exposed to weather conditions. In addition, maintenance is rendered considerably more difficult. Moreover, deviations, such as a bearing play or a buckling of the mast, can also occur which lead to a falsification of the determined position of the ground working tool.

From GB 2 422 389 A a foundation engineering apparatus is known, in which GPS-receivers are arranged on a mast head to receive corresponding position information signals and determine a relative deviation of the construction apparatus with respect to a predetermined drilling position.

US 2012/0200452 A1 describes that a reflector located on a bored pile as a foundation element to be introduced into the ground is measured by means of a sensor in order to determine the position of the bored pile.

However, especially when providing a large number of coordinated foundation engineering works a high degree of precision in determining the position of the executed ground works is of vital importance.

The invention is therefore based on the object to provide a foundation engineering apparatus and a foundation engineering method using a foundation engineering apparatus, which allow for a particularly high precision in determining the position of an executed ground work even under changing conditions.

According to the invention the object is achieved on the one hand by a foundation engineering apparatus having the features of claim 1 and by a foundation engineering method having the features of claim 9.

Advantageous embodiments are stated in the dependent claims, the description and the Figures.

The foundation engineering apparatus according to the invention is characterized in that in addition to the GPS-unit a measuring means is provided which is designed to determine the distance between the GPS-unit and the ground working tool.

A basic idea of the present invention resides in the fact that, instead of storing a fixed distance value in relation to the given GPS-unit, the determination of position of a ground working tool with respect to a GPS-unit is provided by a measurement that can be carried out as often as desired by means of a measuring means. The GPS-signal is complemented by the measuring signal so that a precise position of the working location is ascertained at all times.

The GPS-unit can be provided in a suitable and protected position.

From the positional data received from the GPS-unit and the determined distance of the GPS-unit to the ground working tool the measuring means is able to determine a position of the ground working tool in a particularly precise manner.

The positional data received from the GPS-unit can in particular be the position of the GPS-unit, as determined by triangulation of a least four, preferably five satellites and transmitted to the GPS-unit.

The measuring means is designed to determine a distance of the ground working tool to the GPS-unit in particular in a lower area or in an area on the ground working tool that is close to the ground. Furthermore, the distance measurement between measuring apparatus and ground working tool can be effected in a horizontal plane that preferably runs through the measuring apparatus. The determination of the distance between the measuring means and the ground working tool can be repeated any number of times, in particular at regular intervals. In addition, the measuring means can be designed to determine a distance of the GPS-unit, in particular at the moment of measurement, to the ground working tool on the basis of the distance measurement between the measuring means and the ground working tool and a stored distance between the measuring means and the GPS-unit.

In this way, in particular changes of the distance between the GPS-unit and the ground working tool arising, for example, from a mast adjustment, bearing play, conversions, which may have an influence on the distance between GPS-unit and ground working tool, or a change of the tool can be taken into account in the positioning of the ground working tool.

Through an appropriate number of measurements, for instance 1 measurement per second or more, the position of the ground working tool in the area to be worked upon can be determined at any point in time, in particular in real time. In particular, this can permit a correction of the alignment of the ground working tool during its use and a subsequent verification of the changed position.

Basically, the measuring means can be arranged on the GPS-unit. The distance of the measuring means to the ground working tool can therefore correspond to the distance of the GPS-unit to the ground working tool. The measuring means and the GPS-unit can be designed as a unitary module that can be arranged according to requirement on a part of the foundation engineering apparatus or also in an area around the foundation engineering apparatus, in particular being free-standing as a single element.

According to the invention it is particularly preferred that the measuring means is spaced from the GPS-unit. The measuring means can be arranged at a location that is especially suited for the distance or range measurement. The measuring means, which can comprise a computing unit, determines by calculation the total distance between the GPS-unit and the working tool from the measured partial distance between the measuring means and the working tool and the fixed partial distance between the measuring means and the GPS-unit. This permits a high flexibility in the arrangement of the measuring means, in particular the measuring unit.

According to a further development of the invention it is especially advantageous for the GPS-unit to be provided on an upper carriage of the foundation engineering apparatus. Basically, the foundation engineering apparatus can be designed in one piece. However, the foundation engineering apparatus can also be composed of an upper carriage and an undercarriage, in which case the upper carriage is pivotable with respect to the undercarriage at least in an approximately horizontal plane. By preference, the carrier device with the ground working tool is also arranged on the upper carriage. By arranging the GPS-unit on the upper carriage the position of the GPS-unit with respect to the ground working tool can be set in a first approximation. The provision of the GPS-unit is especially advantageous with regard to a direct visual contact with the position-determining satellites, thereby also requiring little conversion effort with regard to conversions made on the foundation engineering apparatus.

An expedient further development of the invention resides in the fact that the measuring means is designed as a contact-free operating measuring means. Such a measuring means can be provided in an especially low-maintenance manner in a corresponding housing that protects the measuring means against dirt or damage. Moreover, the contact-free measurement can enable a particularly low-maintenance operation with a low degree of wear of the measuring means.

It is especially preferred that the measuring means has a laser, in particular a fan laser. By scanning the ground working tool the laser can measure the position of the latter with respect to the measuring means in a particularly accurate manner. Thus, a determination of the distance of the ground working tool with respect to the GPS-unit is rendered possible in an especially precise manner. In this, the laser can be designed to take a previously determined relevant reference point or area on the ground working tool into account, in particular as a priority, in the distance measurement. For this purpose, such a relevant point or area can be previously fixed by means of the laser or also provided with a marking, more particularly a reflector for the laser light. The laser can be designed to follow the predefined area or point even in the case of a vertical change of position, e.g. during the sinking of a borehole, and to determine by way of angle determination, e.g. between a horizontal plane and the laser measurement beam, the actual horizontal distance of the measurement point or measurement area on the ground working tool to the GPS-unit.

Instead of a laser the measuring means can also be formed of a radar unit, an ultrasonic unit and/or any other/further suitable device for measuring the distance between the measuring means and the ground working tool and for determining the distance between GPS-unit and ground working apparatus.

By preference, the foundation engineering apparatus according to the invention is designed as a drilling apparatus. Such a drilling apparatus can have a drill flight for example which rotates about a central drill flight axis. In this case, the distance of the GPS-unit to the ground working tool can be determined, in particular, by starting from the axis of rotation.

According to a further development the foundation engineering apparatus according to the invention can be designed as a diaphragm wall cutter. This can have at least one, preferably two wheels or drums which rotate about horizontally running axes of rotation and have on their external circumference tools for working the ground. The drums or wheels can be fixed on a base body, via which the at least one drum/wheel of the diaphragm wall cutter can be connected to the carrier device of the foundation engineering apparatus. By preference, when determining the position of the diaphragm wall cutter by means of the measuring means the distance of the GPS-unit to the base body is determined.

According to a preferred further development of the invention the foundation engineering apparatus is designed as a vibrator or a pile driver. These can be arranged on the carrier device of the foundation engineering apparatus and, for the purpose of driving piles or walls into ground, they can in particular be arranged in a movable manner on the carrier device. The measuring means is preferably designed such that the changing distance of the vibrator or pile driver to the measuring means during the vertical driving of a pile or a wall into the ground is taken into account in the manner described above when determining the position of the ground working tool (angle—horizontal plane). The vibrator or pile driver can also be designed to compact ground in a desired area. In such a case, a change of the vertical position of the vibrator or pile driver in relation to the measuring means need not be taken into account.

The foundation engineering method using a foundation engineering apparatus in accordance with the invention is characterized in that a distance between the ground working tool and the GPS-unit is determined with a measuring means.

Another basic idea of the present invention resides in the fact that by means of a measuring means the position of a ground working tool in relation to a provided GPS-unit is adapted in a flexible way and determined adequate to the situation. In this, the GPS-unit can preferably be provided in a stationary manner on the foundation engineering apparatus, in which case the actual distance of the ground working tool to the GPS-unit can be determined by the measuring means. By preference, for the determination of the distance of the ground working tool a central axis of rotation or, if necessary, a fixed point or area on the tool that faces towards the measuring means is set.

A preferred further development of the invention resides in the fact that the distance is determined contact-free by means of a measuring means. Such a contact-free measurement can be carried out with any chosen measurement method known to the skilled person. Through a suitably high repetition rate of the measurement, for instance with one or several measurements per second, the position of the ground working tool can be determined in real time.

According to a further development of the invention it is especially preferred that the distance is determined using at least one laser, in particular a fan laser, as a measuring means. The determination of the position of the ground working tool can preferably be carried out at the beginning of the ground working operations which may be helpful in the positioning of the tool. However, at any given point in time the position of the ground working tool can be verified, determined and corrected on the basis of the determined position.

By preference, according to the foundation engineering method pursuant to the invention a borehole or a cut trench is produced. In this, the measuring means can in particular determine a distance of an axis of rotation (drill flight) or the distance of an external area of the drill flight on the rotating flight blade edges or the position of a base body of a diaphragm wall cutter.

According to a further development of the invention it is particularly preferred that a foundation element, in particular a bored pile or a diaphragm wall segment, is produced. This can be formed e.g. during sinking or after its completion by filling the ground depression with a suitable material, preferably a setting material.

The invention will be explained further hereinafter by way of the accompanying schematic drawing which shows:

FIG. 1: a schematic side view of a foundation engineering apparatus according to the invention.

In FIG. 1 a preferred embodiment of the foundation engineering apparatus 10 according to the invention is illustrated. The foundation engineering apparatus 10 can have an undercarriage 12, on which an upper carriage 11 can be arranged. Furthermore, the foundation engineering apparatus 10 can have a carrier device 13 that is preferably arranged on the upper carriage 11. On the carrier device 13 a drill drive 14 can be arranged that can be movably connected to the carrier device 13 and can drive a ground working tool 15, in particular in the form of a drill flight. Instead of the drilling apparatus provision can also be made for a diaphragm wall cutter, a vibrator or pile driver or another foundation engineering apparatus.

On the upper carriage 11, in particular in a rear area thereof, a GPS-unit 20 can be provided which is designed to transmit and/or receive a position signal (via GPS-satellite). Furthermore, a measuring means 30 can be provided in particular on the upper carriage 11, which is designed to determine a distance between the GPS-unit 20 and the ground working tool 15. For this, the measuring means 30 can preferably carry out a distance measurement between the measuring means 30 and the ground working tool 15. Based on a predetermined distance of the GPS-unit 20 to the measuring means 30 and the measured distance between the ground working tool 15 and the measuring means 30 the measuring means 30 can determine or calculate the distance of the GPS-unit 20 from the ground working tool 15. By preference, the measuring means 30 is arranged in a frontal lower area of the foundation engineering apparatus 10 facing towards the ground working tool and is in particular designed to carry out a measurement in a lower area of the ground working tool 15. The measurement in the lower area of the ground working tool 15 can preferably be carried out above the ground surface. Due to the fact that the distance of the GPS-unit 20 from the ground working tool 15 is determined close to the ground, the actual point of contact of the ground working tool 15 with the surface of the ground to be worked can be determined in a particularly precise manner. The GPS-unit 20 can also be provided together with the measuring means 30 in a joint position. Through this, the distance of the ground working tool 15 to the GPS-unit 20 measured by the measuring means 30 can be converted directly into a position of the ground working tool 15 in relation to the GPS-unit 20.

As an alternative to providing the GPS-unit 20 and/or the measuring means 30 on the upper carriage 11 or in an upper area of the foundation engineering apparatus, the GPS-unit 20 and/or the measuring means 30 can also be provided on the carrier device 13 of the foundation engineering apparatus 10. Through this, the distance between the GPS-unit 20, the measuring means 30 and the ground working tool 15 can be reduced which can have a positive effect on the accuracy of determining the position of the ground working tool 15. The measuring means 30 can be designed to determine the distance of a previously defined reference point on the ground working tool 15 to the measuring means 30 in a repeated or permanent manner. Such a reference point can in particular be characterized in that, based on a horizontal plane running through the measuring means 30, the said reference point is located at a constant angle preferably of 0° with respect to the measuring means 30.

Alternatively, a dynamic reference point can also be determined which can change its location in relation to the measuring means 30 e.g. during movement of the ground working tool along the carrier device 13. For instance this can be the drill drive 14 which is slowly moved during the production of a borehole by means of the ground working tool 15 from a raised first position above the measuring means 30 illustrated in FIG. 1 to a lower position or a position close to the ground. In this case, the measuring means 30 can determine the (horizontal) distance of the drill drive 14 to the measuring means 30 at any point in time and ascertain the angle of the measuring line (e.g. laser), which changes during the sinking of the borehole, between drill drive 14 and the horizontal plane that preferably runs through the measuring means 30, the distance of the drill drive 14 to the measuring means 30, and thus ascertain the distance of the GPS-unit 20 to the ground working tool 15 or to the drill drive 14 that can be arranged above the ground working tool 15.

Basically, according to the invention the measuring means 30 and/or the GPS-unit 20 can be provided in a frontal area of the foundation engineering apparatus, whereby measurements in an area close to the ground can be carried out in particular.

The invention claimed is:

1. A foundation engineering apparatus for producing a foundation element in a ground, comprising:
    a carrier device,
    a ground working tool which works the ground at a ground working location to produce borehole or a cut trench as a ground recess which can be filled with a suitable material during a sinking or after completion of producing the foundation element, and
    at least one GPS-unit which is arranged on the carrier device and designed to determine a position of the working location,
    wherein the at least one GPS-unit is arranged at a distance to the ground working location,
    wherein a measuring means is provided on the carrier device in addition to the at least one GPS-unit, and the measuring device is arranged at another distance to the ground working location, wherein
    the measuring means is designed to determine a distance between the at least one GPS-unit and the ground working tool with a distance measurement of the measuring means to the ground working tool,
    the measuring means having a fan laser.

2. The foundation engineering apparatus according to claim 1, wherein
    the measuring means is spaced from the at least one GPS-unit.

3. The foundation engineering apparatus according to claim 1, wherein the at least one GPS-unit is provided on an upper carriage of the foundation engineering apparatus.

4. The foundation engineering apparatus according to claim 1, wherein
the measuring means is designed as a contact-free operating measuring means.

5. The foundation engineering apparatus according to claim 1, wherein
the foundation engineering apparatus is designed as a drilling apparatus.

6. The foundation engineering apparatus according to claim 1, wherein
the foundation engineering apparatus is designed as a diaphragm wall cutter.

7. The foundation engineering apparatus according to claim 1, wherein
the foundation engineering apparatus is designed as a vibrator or a pile driver.

8. A foundation engineering method using the foundation engineering apparatus according to claim 1, wherein
the ground at the ground working location is worked with the ground working tool which is arranged on the carrier device, and
a position of the ground working location is determined by means of the at least one GPS-unit which is spaced from the ground working location,
wherein
the distance between the ground working tool and the at least one GPS-unit is determined with the measuring means by means of the distance measurement of the measuring means to the ground working tool.

9. The foundation engineering method according to claim 8, wherein
the distance is determined contact-free by means of the measuring means.

10. The foundation engineering method according to claim 8, wherein
the distance is determined using at least the fan laser as the measuring means by scanning the ground working tool.

11. The foundation engineering method according to claim 8, wherein
a bored pile or a diaphragm wall segment, is produced.

* * * * *